May 21, 1968 W. L. FERRIGNO, JR 3,384,764
CONTROL SIGNAL TRANSMITTER INCLUDING COMPLEMENTARY TRIGGER
AND OSCILLATOR TRANSISTORS
Filed Jan. 30, 1964 2 Sheets-Sheet 2

INVENTOR:
WILLIAM L. FERRIGNO, Jr.

BY Norman C. Fulmer

HIS ATTORNEY.

United States Patent Office 3,384,764
Patented May 21, 1968

3,384,764
CONTROL SIGNAL TRANSMITTER INCLUDING COMPLEMENTARY TRIGGER AND OSCILLATOR TRANSISTORS
William L. Ferrigno, Jr., Barneveld, N.Y., assignor to General Electric Company, a corporation of New York
Filed Jan. 30, 1964, Ser. No. 341,366
2 Claims. (Cl. 307—262)

ABSTRACT OF THE DISCLOSURE

A control signal transmitter including a trigger transistor having a phase control circuit associated therewith, the trigger transistor selectively triggering an oscillator transistor of an opposite conductivity type to the trigger transistor.

---

This invention relates to transmitters for producing control signals, and particularly relates to transmitters for producing repetitive bursts or pulses of alternating voltage, these pulses being synchronized with respect to an alternating power current which is used for supplying electrical power to motors of model trains or cars or other vehicles, or other electrical devices.

Patent application Ser. No. 340,673, filed Jan. 28, 1964, now Patent 3,355,643 assigned to the same assignee as the present invention, describes a remote control system for controlling several model trains, cars, and the like, on the same track or electrical power system, in which the motors or other electrical devices are controlled in speed and direction by means of variably phased pulses of alternating voltage.

An object of the present invention is to provide an improved transmitter for producing synchronized pulses of alternating voltage.

Another object is to provide a reliable low-cost transmitter circuit for producing synchronized pulses of alternating voltage.

Other objects will be apparent from the following description and claims, and from the accompanying drawing.

The pulse-producing transmitter of the invention comprises, basically and in its preferred embodiment, an oscillator circuit for producing an alternating voltage at a selected frequency, and a trigger circuit for turning the oscillator circuit on, when desired, at a chosen time during each alternate half-cycle of an alternating power current, the selected frequency of the alternating voltage being higher than that of the power current. A phase control circuit variably controls the phasing of the trigger circuit with respect to the alternating voltage. The oscillating circuit preferably comprises a transistor of one conductivity type, for example the PNP type, while the trigger circuit preferably comprises a transistor of the opposite conductivity type, for example the NPN type, having an output electrode connected to an input electrode of the oscillator transistor. The invention further comprises a simple and reliable phase control circuit for the trigger circuit, having a diode and a variable resistance connected in parallel and arranged to charge a capacitance during certain alternate half-cycles of the alternating current, the variable resistor providing a variable time-constant discharge path for the capacitor.

Figure 1:
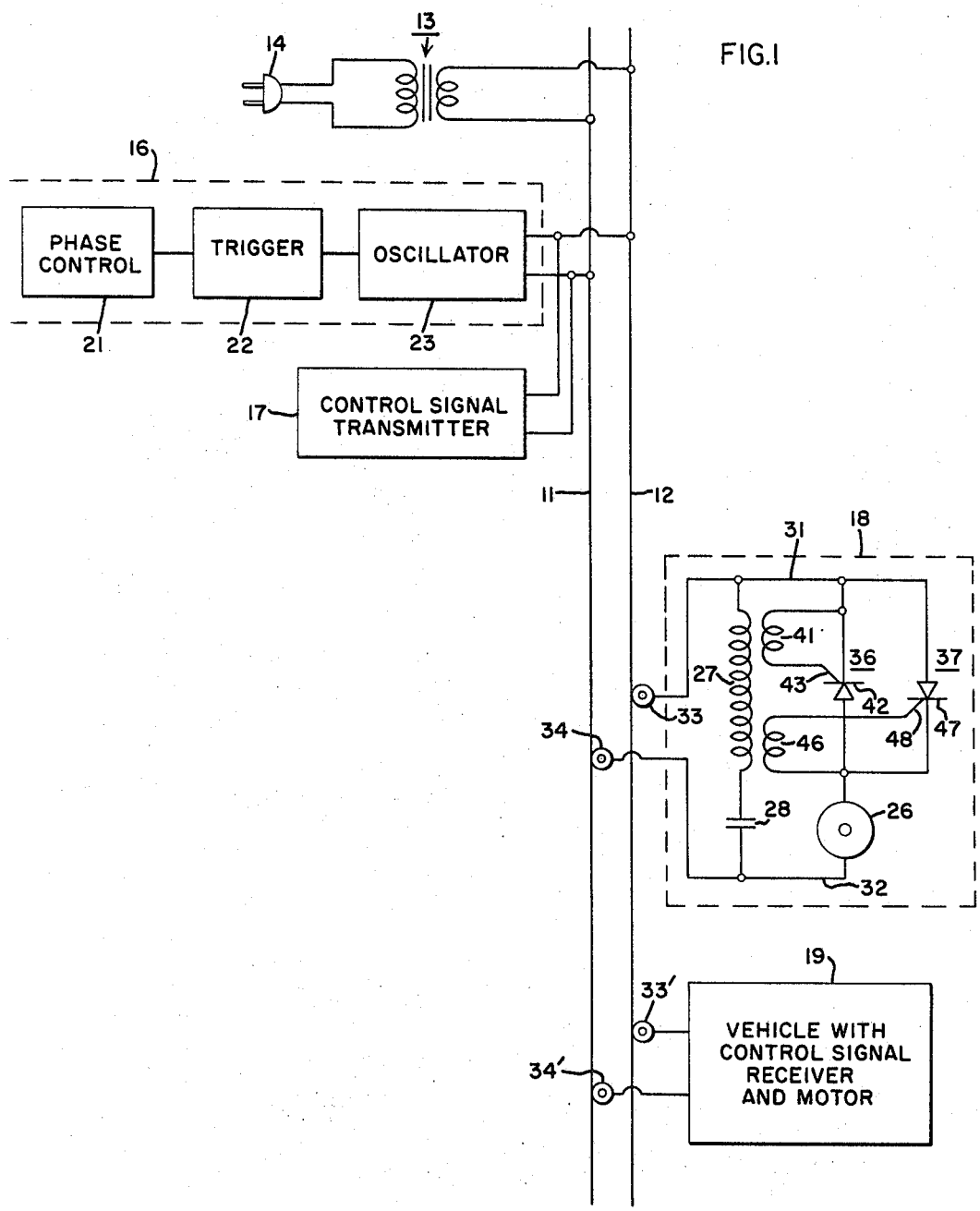
Figure 2:
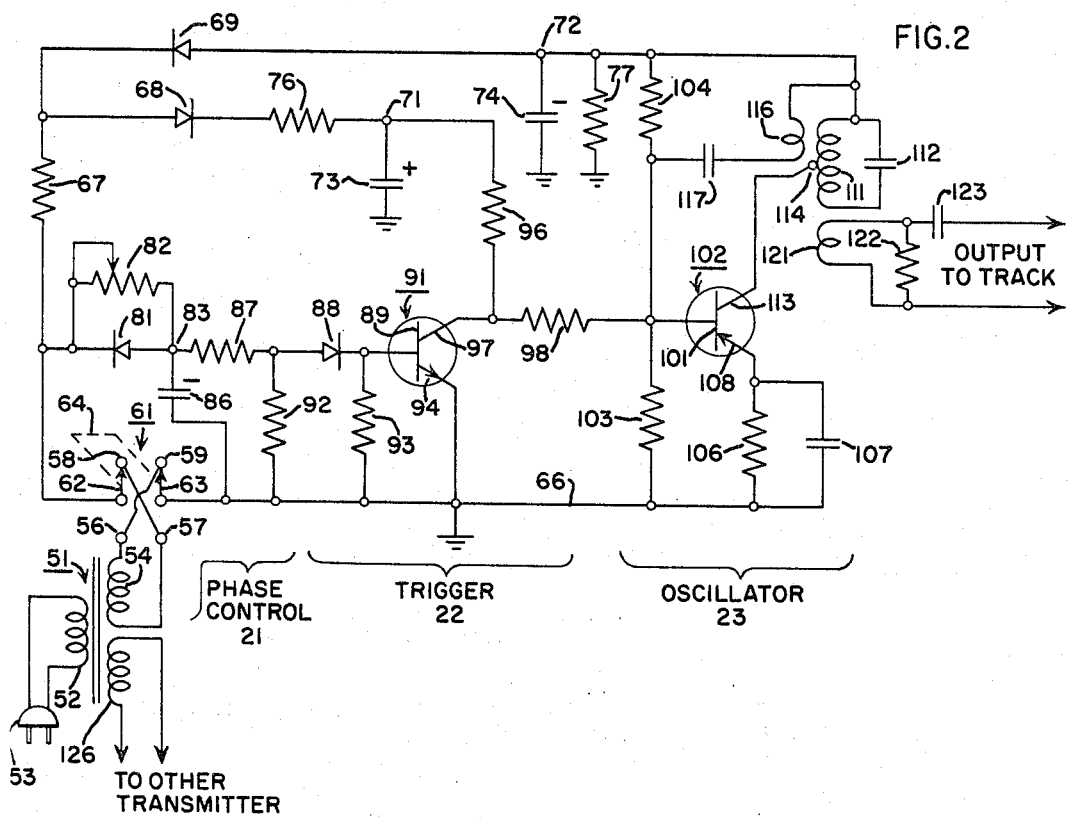
Figure 3:
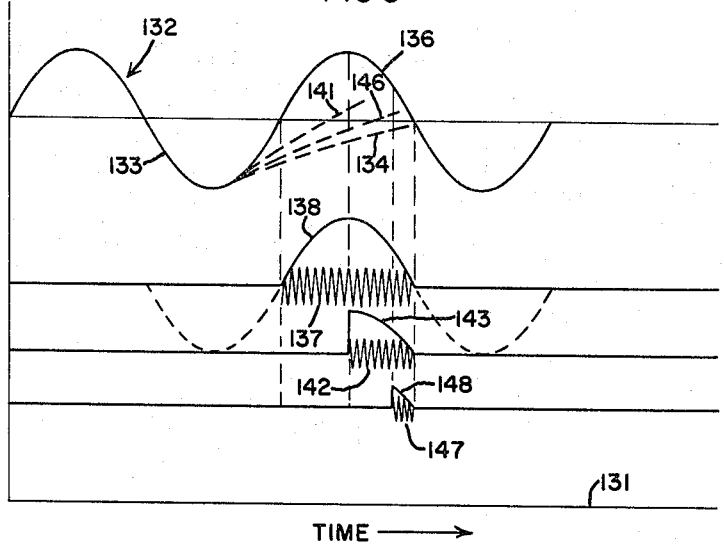

FIG. 1 of the drawing is an electrical diagram of a remote control vehicle system embodying the transmitter of the invention;

FIG. 2 is an electrical schematic diagram of a preferred embodiment of the transmitter of the invention; and FIG. 3 is a plot of signals for explaining the functioning of the invention.

The general arrangement of the control system will first be described, and then the improved transmitter of the invention will be described in detail.

In FIG. 1, tracks 11 and 12, or electrical conductors, of a train or other vehicle system have alternating power current, of 60 cycles for example, applied thereto by means of a transformer 13 adapted for connector to household power by means of a plug 14. A first transmitter 16 and a second transmitter 17, each of which utilizes the invention and which respectively provide control pulses of different frequency alternating voltages, are connected to the tracks 11 and 12. First and second trains or other vehicles 18, 19, each having a motor and a receiver circuit for controlling the motor, are connected to the tracks 11 and 12.

The transmitter 16 comprises a phase control circuit 21, a trigger circuit 22, and an oscillator circuit 23, and will be described in detail with reference to FIG. 2. The other transmitter 17 is similar to the transmitter 16, but the oscillator thereof oscillates at a different frequency than that of transmitter 16 so as to control a different receiver circuit. For example, the oscillator 23 of transmitter 16 oscillates at a selected frequency (such as 100 kilocycles per second) so as to actuate only the receiver circuit in vehicle 18, and the oscillator of transmitter 17 oscillates at a different frequency (such as 255 kilocycles per second) so as to actuate only the receiver circuit in vehicle 19.

The vehicle 18 includes a D-C motor 26 for driving the vehicle, and the receiver circuit comprises an inductor 27 and capacitor 28 connected in series across conductors 31 and 32 which are respectively connected to the tracks 11 and 12 by means of vehicle wheels 33, 34, or by sliding brushes or other suitable means. The inductor 27 and capacitor 28 are series resonant at the 100 kc. frequency of the oscillator 23. A pair of silicon controlled rectifiers 36 and 37 (commonly called SCR's) are connected in parallel with unlike current-carrying electrodes connected together, in so-called back-to-back relationship, between the conductor 31 and the motor 26, the other motor terminal being connected to the conductor 32. A first secondary winding 41 is inductively coupled to inductor 27 and is connected between the cathode 42 and control electrode 43 of the SCR 36. Similarly, a second secondary winding 46 is inductively coupled to inductor 27, and is connected between the cathode 47 and control electrode 48 of the SCR 37.

The control pulses of 100 kc. bursts produced by the transmitter 16 are selectively received by the resonant circuit of the inductor 27 and capacitor 28, and are coupled by the secondary windings 41 and 46 to the control electrodes of both SCR's 36 and 37. If these control pulses occur at times when the 60 cycle alternating current is positive at the conductor 31, with respect to conductor 32, the SCR 37 will be rendered conductive upon commencement of each of the pulses and will apply current in a "positive" direction through the motor 26 for a portion of each positive half-cycle, thereby causing the motor 26 to rotate in one direction, for example the "forward" direction. Since the SCR, upon being rendered conductive, remains conductive until the current therethrough finishes its half-cycle duration, it is not important as to how long each control pulse lasts. By varying the phase of the control pulses with respect to the power current, the speed of the motor can be varied at will. If the control pulses occur at times when the power current is negative at conductor 31, the other SCR 36 will be rendered conductive and apply current in a "negative" direction through the motor 26 for a portion of each negative half-cycle, thereby causing it to rotate in the other or "reverse" direction, for reversal of the vehicle 18.

Similarly, the alternating-voltage control signal produced by the transmitter 17 is selectively utilized by the receiver of vehicle 19 to control the motor thereof. Vehicles 18 and 19 may contain identical circuitry except that their resonant filters are tuned to different frequencies corresponding to the different frequencies of the control voltage signals produced by the transmitters 16 and 17. Any desired number of transmitters and receivers may thus be employed.

The control system in general and its circuitry are more fully described, and are claimed, in the aforementioned copending patent application.

From the foregoing, the purpose of the control signal transmitters will be apparent. The improved transmitter of the invention will now be described, with reference to FIGS. 2 and 3.

A power supply transformer 51 has a primary winding 52 connected to a power plug 53 for insertion into an A-C household outlet, and a secondary winding 54 having the ends thereof cross-connected to a first pair of switch contacts 56, 57, and a second pair of contacts 58, 59, of a phase reversal switch 61 which has two contact arms 62, 63 which are mechanically linked together as indicated at 64 to make contact with contacts 56 and 57 or with contacts 58 and 59. Switch arm 63 is connected to an electrical "ground" conductor 66. Switch arm 62 is connected, via a filter resistor 67, to two rectifiers 68 and 69. Rectifier 68 is connected to provide a positive-polarity direct voltage at point 71, and rectifier 69 is connected to provide a negative-polarity direct voltage at point 72. Filter capacitors 73 and 74 are connected between electrical ground and the voltage points 71 and 72, respectively. A voltage-dropping resistor 76 is interposed in the path of rectifier 68, and a "bleeder" resistor 77 is connected across the capacitor 74.

A diode 81 and a phase-adjusting variable resistor 82 are connected in parallel between the switch arm 62 and a point 83, and a filter capacitor 86 is connected between point 83 and electrical ground. These elements constitute a trigger phase control circuit, in accordance with a feature of the invention. A resistor 87 and a diode 88 are connected in series between point 83 and the base electrode 89 of a trigger transistor 91. Resistors 92 and 93 are connected between electrical ground and the electrodes of diode 88, respectively. The diode 81 is poled so as to conduct negative current toward the base electrode 89, whereas the diode 88 is oppositely poled.

The emitter electrode 94 of the trigger transistor 91 is grounded, and a load resistor 96 is connected between the collector electrode 97 and the positive voltage point 71.

A current-limiting and isolation resistor 98 is connected between the collector electrode 97 and the base electrode 101 of an oscillator transistor 102. Resistors 103 and 104, for providing base bias, are connected between the base electrode 101, and electrical ground and point 72 of negative voltage, respectively. A biasing resistor 106 and capacitor 107 are connected in parallel between the emitter electrode 108 and electrical ground.

An oscillator coil 111 is connected in parallel with a capacitor 112, and an end thereof is connected to the point 72 of negative voltage. The collector electrode 113 of oscillator transistor 102 is connected to a tap 114 on the oscillator coil 111. A "tickler" feedback coil 116 is inductively coupled to the oscillator coil 111, and an end thereof is connected to the point 72 of negative voltage. A feedback capacitor 117 is connected between the other end of the feedback coil 116 and the base electrode 101. When this oscillator 23 oscillates, its frequency (100 kc., for example) is determined by the resonant frequency of coil 111 and capacitor 112. An output winding 121 is inductively coupled to the oscillator coil 111. A resistor 122 connected across the output winding 121 is for maintaining a more constant loading on the oscillator, and a capacitor 123 couples A-C control signals from the oscillator 23 to the tracks 11 and 12 and also prevents the output winding 121 from providing a D-C and low-frequency A-C short circuit across the tracks.

When one or more other transmitters are employed, certain portions of the just-described transmitter circuit can be used in common with all of the transmitters. For example, a single power supply will suffice, with one or more additional windings 126 provided on the transformer 51 to provide A-C for one or more additional transmitters. The positive and negative voltage points 71 and 72 may be utilized by other transmitters, so that additional rectifiers 68 and 69, and associated circuitry, are not required. Additional transmitter output windings may be connected in series with the output winding 121.

The transmitter circuit of FIG. 2 functions as follows, with reference to FIG. 3, in which the horizontal axis 131 represents time. Normally, neither of the transistors 91 and 102 draws any appreciable current, and hence the oscillator 23 does not oscillate. The sine wave 132 represents the phase of the current at switch arm 62, which current is applied to the cathode of diode 81. The diode 81 conducts during the negative half-cycles 133 and charges the capacitor 86 negatively. This negative charge leaks off through the variable resistor 82, and also partly through resistors 87 and 92. When the variable resistor 82 is set at its maximum resistance value, the capacitor 86 discharges along the path 134 of FIG. 3 and hence the point 83 does not become slightly positive as is required to bias the base electrode 89 of the trigger transistor to cause this trigger transistor 91 to become conductive. In this condition, the motor 26 in the associated vehicle will be stopped.

If the variable resistor 82 is set for minimum resistance, it shorts out diode 81, and the positive half-cycles 136 of the alternating current 132 will flow to the base electrode 89 and cause the trigger transistor 91 to be conductive during the full period of every positive half-cycle. When the trigger transistor 91 is conductive, its collector electrode 97 assumes a potential near electrical ground, which biases the oscillator transistor 102 "on" so that it oscillates, at a frequency determined by the coil 111 and capacitor 112, until the trigger transistor goes "off" at the end of the positive half-cycle 136. Numeral 137 indicates the oscillator output signal, and numeral 138 indicates the resulting half-cycle of current which will flow through the motor 26 in a vehicle 18. The diode 88 functions to prevent the negative half-cycles 133 from reaching the base electrode 89, as these negative half-cycles could injure the trigger transistor 91.

If the variable resistor 82 is adjusted to an intermediate value of resistance, such as by means of a "vehicle speed" control knob, the discharge of negative voltage on capacitor 86 which occurs every cycle of the current 132, will be as indicated by numeral 141, and renders the base electrode 89 slightly positive at a time half-way through the positive half-cycle 136, whereby the trigger transistor 91 conducts and turns on the oscillator 102 to produce an output signal indicated at 142, whereby the motor current 143 is at a half-speed value.

If the variable resistor 82 is adjusted for greater (but not maximum) resistance, the discharge of capacitor 86 will be as indicated at 146, and renders the trigger transistor 91 conductive at a time near the end of the positive half-cycle 136, which causes the oscillator 23 to produce an output control signal as indicated at 147. The resulting small current 148 through the vehicle motor causes slow-speed operation of the vehicle.

The motor currents 138, 143, and 148 will be of given polarity and the motor will rotate in a given direction. Reversal of the phase of the control circuit current 132 by means of reversal switch 61, will shift the phase of the control pulses 137, 142, and 147 by 180 degrees, and hence the motor currents 138, 143, and 148 will be reversed in polarity and the motor will rotate in the opposite direction.

The circuit of the invention has been found to provide a very effective, reliable and low-cost transmitter for controlling model trains, cars, and the like.

While a preferred embodiment of the invention has been shown and described, other embodiments and modifications thereof will be apparent to those skilled in the art, and will fall within the scope of invention as defined in the following claims.

What I claim is:

1. A circuit for providing pulses of alternating voltage which are synchronized with respect to an alternating current of given frequency, comprising an oscillator circuit including an oscillator transistor of one conductivity type and adapted when actuated to oscillate at a selected frequency greater than said given frequency to provide said alternating voltage, and a trigger circuit comprising a triggering transistor of opposite conductivity type to said oscillator transistor and having a collector electrode connected to the base electrode of said oscillator transistor, a diode and a variable resistor connected in parallel to provide a parallel combination, a capacitor connected in series with said parallel combination to provide a series combination, means to apply said alternating current across said series combination, said diode being poled to cause said capacitor to become charged by said alternating current during half-cycles thereof of opposite polarity to said given polarity, said variable resistor providing a variable time-constant path for at least partial discharge of said capacitor during said alternate half-cycles of given polarity, means biasing said transistor normally in the "off" condition, and means connected between said capacitor and the base electrode of said triggering transistor for applying the discharging potential of said capacitor to said base electrode of the triggering transistor to render said triggering transistor conductive when said discharging potential reaches a predetermined value during each of said half-cycles of given polarity, thereby changing the voltage on said base electrode of the oscillator transistor to cause said oscillator to oscillate during the remainder of each of said half-cycles of given polarity.

2. A circuit as claimed in claim 1, in which said means connected between said capacitor and the base electrode of said triggering transistor comprises a diode connected in opposite polarity to the polarity of connection of the first-named diode.

References Cited
UNITED STATES PATENTS 3,222,583  12/1965  Gutzwiller _____ 323—22 XR
3,243,711  3/1966  King et al. _____ 323—22

JOHN S. HEYMAN, *Primary Examiner.*

ARTHUR GAUSS, *Examiner.*

S. D. MILLER, *Assistant Examiner.*